United States Patent [19]

Archer et al.

[11] Patent Number: 5,159,917
[45] Date of Patent: Nov. 3, 1992

[54] PORTABLE BARBECUE COOKING GRILL

[75] Inventors: Robert Archer, Johnson City; Harold O. Duggin, Greeneville, both of Tenn.

[73] Assignee: Meco Corporation, Greeneville, Tenn.

[21] Appl. No.: 801,228

[22] Filed: Dec. 3, 1991

[51] Int. Cl.⁵ ............................ A47J 37/00; F24B 3/00
[52] U.S. Cl. .................................. 126/25 R; 126/9 R; 126/305; 220/293
[58] Field of Search ............... 126/25 R, 25 A, 41 R, 126/9 R, 9 B, 30, 29, 304, 305; 248/150, 151, 152, 529; 220/293

[56] References Cited

U.S. PATENT DOCUMENTS

| | | | |
|---|---|---|---|
| 2,431,905 | 12/1947 | Anicetti | 220/293 |
| 2,780,392 | 2/1957 | Nonhof | 220/293 |
| 4,192,283 | 3/1980 | Kridler | 126/25 AA |
| 4,331,127 | 5/1982 | Grosso | 126/377 |
| 4,390,002 | 6/1983 | Daily | 126/25 R |
| 4,453,530 | 6/1984 | Schlosser | 126/25 R |
| 4,463,746 | 8/1984 | Knuth et al. | 126/25 R |
| 4,535,749 | 8/1985 | Schlosser et al. | 126/25 R |
| 4,763,640 | 8/1988 | Schnack | 126/25 R |
| 4,966,126 | 10/1990 | Wu | 126/25 R |
| 5,044,265 | 9/1991 | Janssen | 99/418 |

FOREIGN PATENT DOCUMENTS

| | | | |
|---|---|---|---|
| 362529 | 4/1990 | European Pat. Off. | 220/293 |
| 112031 | 12/1917 | United Kingdom | 220/293 |

Primary Examiner—James C. Yeung
Attorney, Agent, or Firm—David H. Semmes

[57] ABSTRACT

Barbecue grills, particularly small-size portable grills adapted for picnics, stadium parking lot cooking and the like. The portable grill comprises a hemispherical cooking bowl and a hemispherical hood removably supported upon the top rim of the cooking bowl. A pair of locking brackets is inserted within the cooking bowl rim, so as to engage the hood such, that the hood and cooking bowl are locked together during carrying.

3 Claims, 5 Drawing Sheets

PORTABLE BARBECUE COOKING GRILL

BACKGROUND OF THE INVENTION

1. Field of the Invention

Portable barbecue cooking grills, particularly a lightweight assembly wherein the cooking bowl and hood are interlocked for convenient portability.

2. Description of the Prior Art

| | |
|---|---|
| KRIDLER | 4,192,283 |
| GROSSO | 4,331,127 |
| DAILY | 4,390.002 |
| SCHLOSSER | 4,453,530 |
| SCHNACK | 4,763,640 |
| HSI-LIANG WU | 4,966,126 |
| JANSSEN | 5,044,265 |

SUMMARY OF THE INVENTION:

A portable cooking grill comprises a hemispherical cooking bowl and a hemispherical hood which is removably supported upon the bowl. The hood may carry a carrying handle. The hood and bowl are interlocked by complementary stud and bracket means, such that a lateral twist of the hood locks the hood onto the bowl. As a result, the assembly may be carried without loosening of the hood and spilling of live charcoal or food being cooked.

DESCRIPTION OF THE PREFERRED EMBODIMENTS

Figure 2:
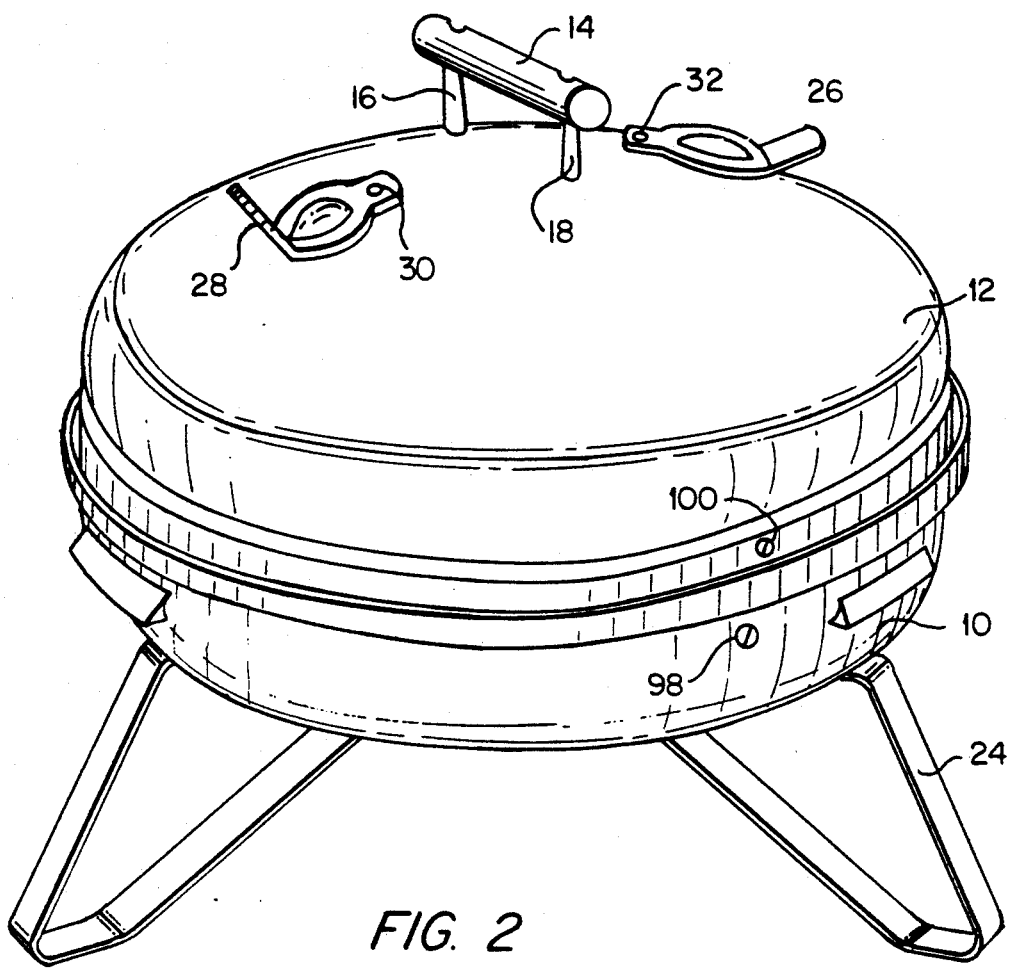
FIG. 2 is a front elevation.
Figure 1:
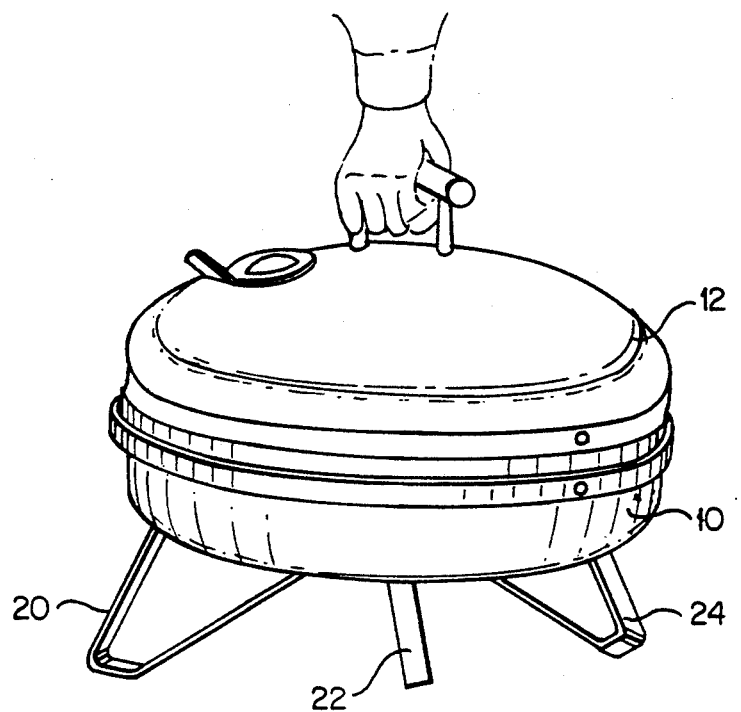
FIG. 1 is a perspective showing the portable cooking grill being carried.

In FIG. 1 the portable cooking grill is illustrated as comprising hemispherical cooking bowl 10 and inverted hemispherical hood 12 removably supported upon cooking bowl 10. A wooden or insulated carrying handle 14 may be secured to hood 12 by means of brackets 16, 18 secured on the top of hood 12.

Supporting legs 20, 22, 24 may be secured at their free ends to the bottom of cooking bowl 10.

Removable hood 12 may have a plurality of pivotable vent covers 26, 28 secured to hood 12 by stove bolts 30, 32 or the like.

Figure 3:
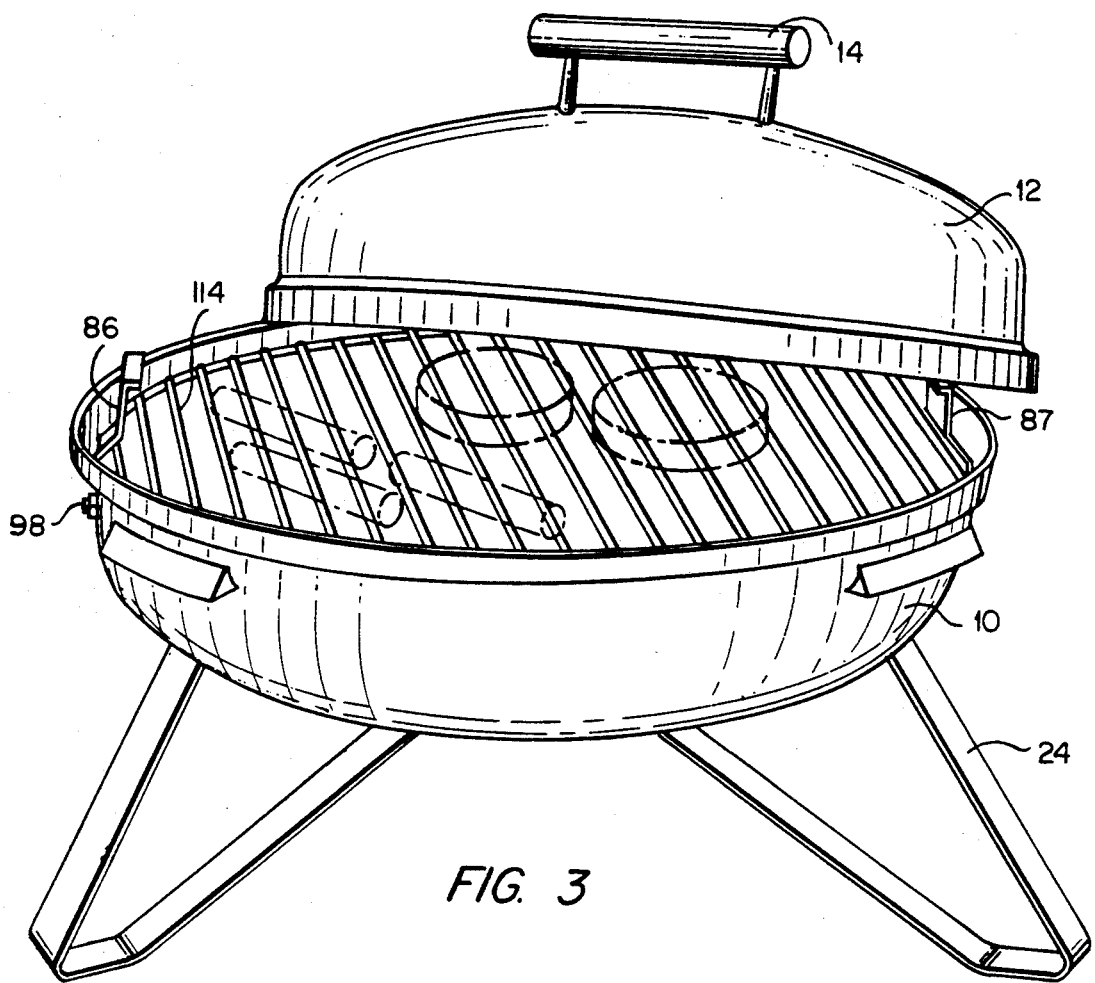
FIG. 3 is a front elevation showing the hood partially removed from the cooking bowl and food being cooked.

In FIG. 3 removable hood 12 is shown as partially removed from cooking bowl 10 so as to expose cooking grill 114 removably positioned within cooking bowl 10.

Opposed locking brackets 86, 87 are secured within the top of cooking bowl 10.

Figure 4:
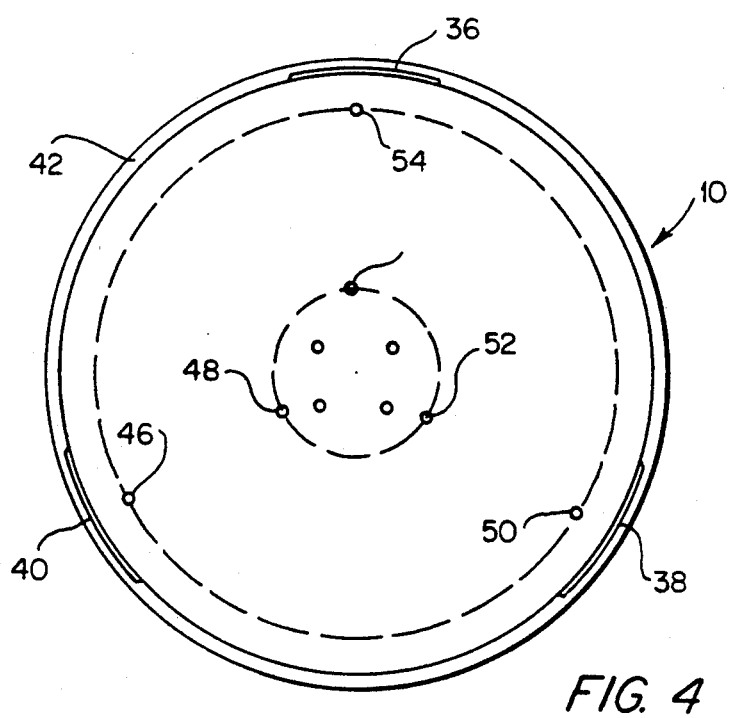
FIG. 4 is a top plan of the cooking bowl.
Figure 5:
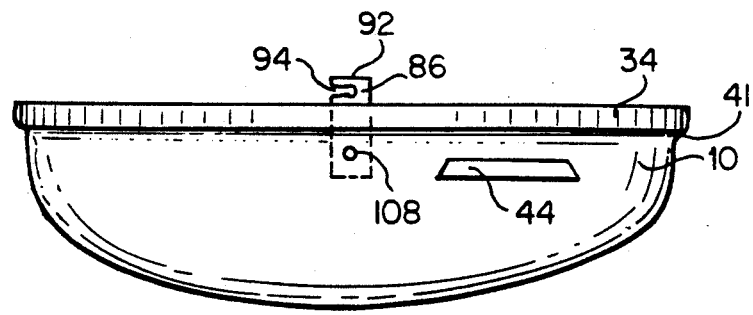
FIG. 5 is a side elevation of the cooking bowl.

In FIGS. 4 and 5, cooking bowl 10 is illustrated as including peripheral top flange 42, rim 34 and shoulder 41. A plurality of air vents 36, 38, 40 may be defined in the periphery of the bowl.

As illustrated, pairs of holes 46–48; 50–52 and 54–56 may be cut in the bowl so as to secure the free ends 76, 78 of the supporting legs 24 by means of conventional stove bolts and locking nuts.

Figure 6:
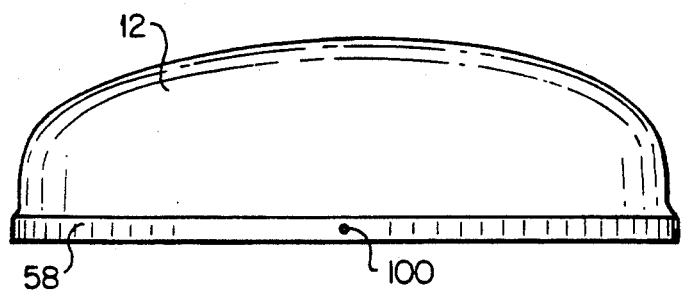
FIG. 6 is a side elevation of the removable hood.
Figure 7:
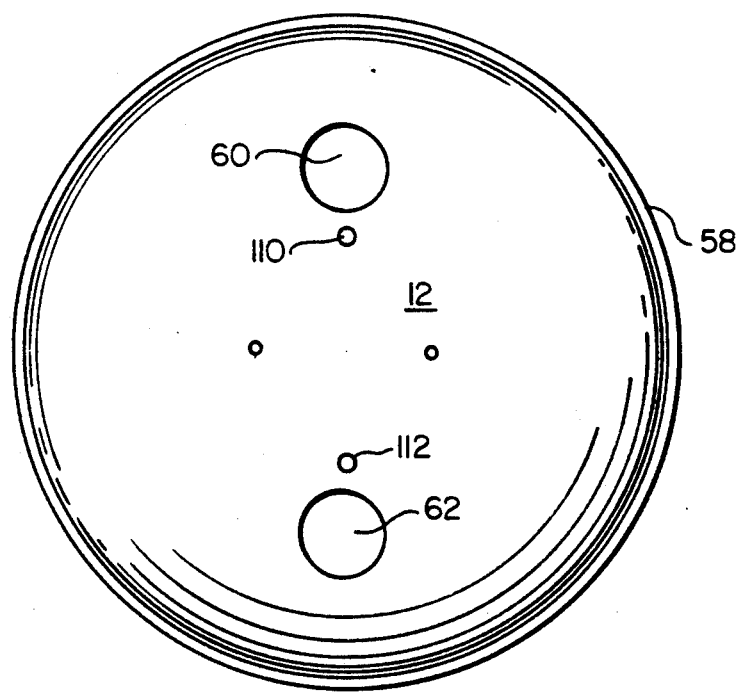
FIG. 7 is a top plan of the removable hood.

As illustrated in FIGS. 6 and 7, removable hood 12 has peripheral lower flange 58 which is complementally fitted within cooking bowl upper flange 42, so as to rest upon cooking grid 114 within inner shoulder 41. A plurality of hood vents 60, 62 may be covered by vent covers 26, 28 by means of stove bolts 30, 32 engaging holes 110, 112.

Figure 8:
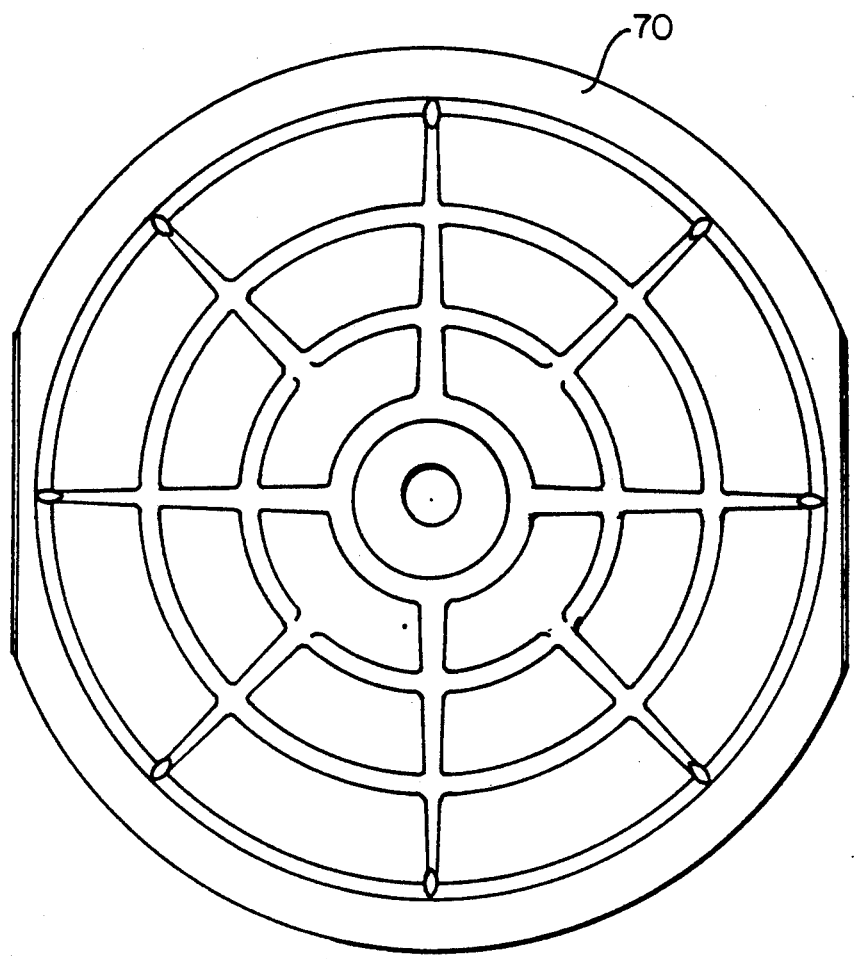
FIG. 8 is a top plan of the charcoal pan.

A removable cooking pan 70 is illustrated in FIG. 8, cooking pan 70 resting within cooking bowl 10 so as to abut stove bolts which extend respectively through supporting legs upper leg apertures 82, 84 into holes 46, 50 and 54. Manifestly, pan 70 reflects radiated heat and supports ashes in the bottom of cooking bowl 10.

Figure 9:
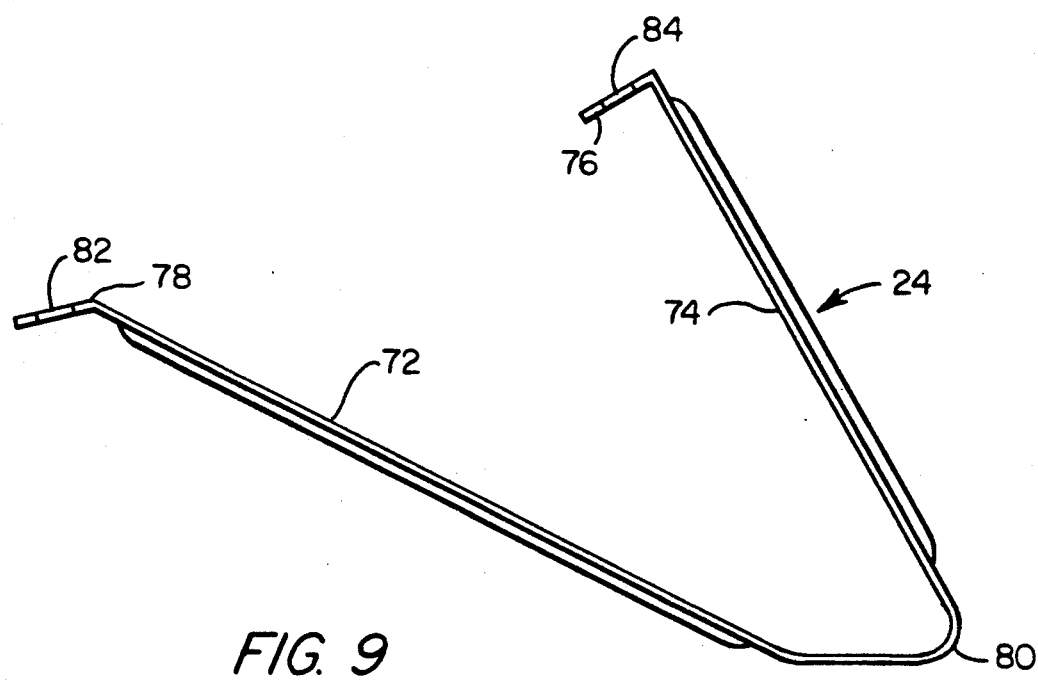
FIG. 9 is a side elevation of a supporting leg having a bent middle and opposed ends which are secured to the cooking bowl.

As illustrated in FIG. 9, supporting legs 24 are bent so as to have a horizontal mid-portion as a supporting surface, such that free ends 76, 78 may be secured to the cooking bowl bottom by means of stove bolts extending through apertures 82, 84.

Figure 10:
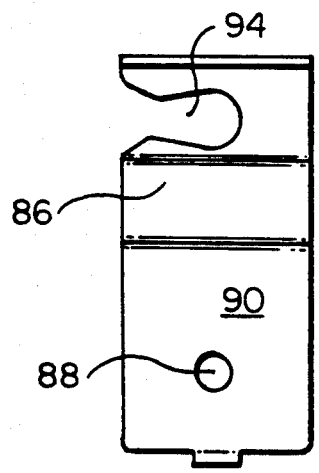
FIG. 10 is a front elevation of the locking bracket.
Figure 11:
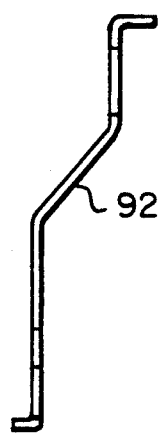
FIG. 11 is a side elevation of the locking bracket.

In FIGS. 5, 10 and 11, locking bracket 86 is shown as comprising lower vertical portion 90 having securing hole 88 and upper inset portion 92 having horizontal locking aperture 94. The pair of identical brackets 86, 87 is secured to the interior of cooking bowl 10 by means of stove bolts 98 extending through securing hole 88 such that each locking aperture 94 is presented inwardly adjacent peripheral flange 42. A pair of stove bolts or like studs 100 extends through the hood peripheral bottom flange 58 so as to engage each locking aperture 94 upon horizontal rotation of the hood 12 with respect to cooking bowl 10.

Figure 12:
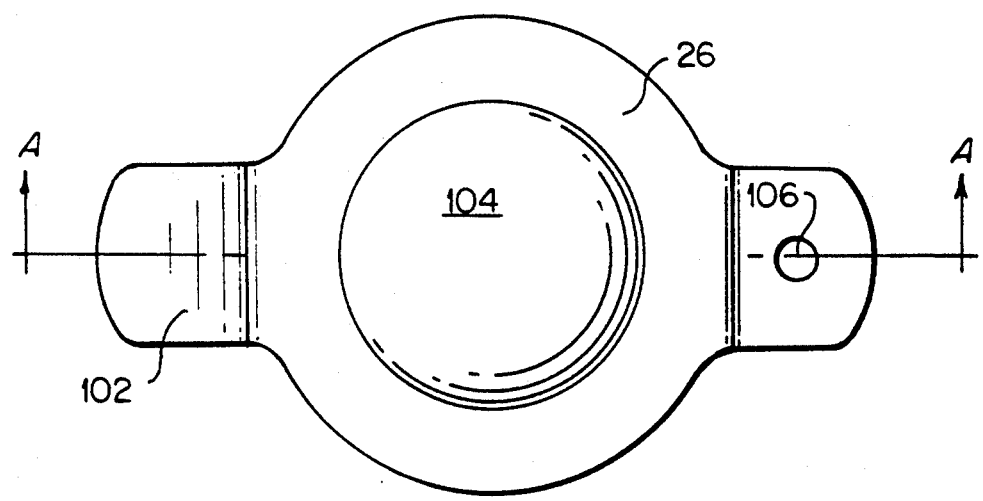
FIG. 12 is a top plan of the damper vent pivoted in the hood top.
Figure 13:
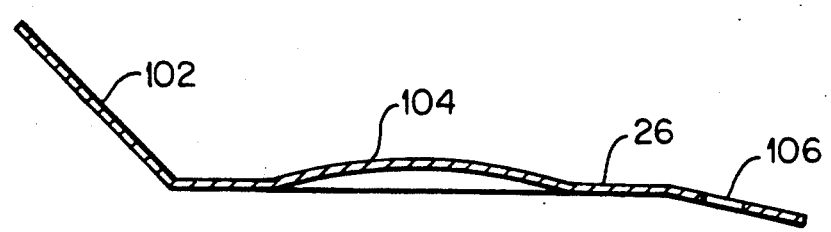
FIG. 13 is a side elevation of the damper vent.

As illustrated in FIG. 12 the vent covers 26, 28 include a median raised surface 104, a locking aperture 106 through which stove bolts 30, 32 may engage the hood top and a free bent end 102 which may be grasped manually to adjust the size of the vent opening.

As will be apparent, the assembly provides a compact, lightweight grill for barbecuing hot dogs, hamburgers and other small meats. The cooking bowl may be modified for gas fired or electric heating modifications. Manifestly, the cooking bowl, removable hood and locking brackets may be variously constructed without departing from the spirit of the invention.

We claim:

1. A portable barbecue cooking grill comprising:
   a) a cooking bowl having an hemispherical body with a peripheral top flange at its open top and an inset shoulder adjacent said top flange as a support for a cooking grill;
   b) a plurality of supporting legs affixed to a lower portion of said cooking bowl;
   c) a removable hood of hemispherical configuration having a peripheral bottom flange complementally supported within the peripheral flange of said cooking bowl, such that said cooking bowl peripheral top flange and said bowl peripheral bottom flange engage and overlap each other, said hood further including:

i. a pair of radially inwardly extending locking studs supported in said peripheral bottom flange, and ii. an insulated handle supported upon the top of said hood;

d) lock means in the form of a pair of inset brackets supported in said cooking bowl adjacent said peripheral top flange, each said bracket including a locking aperture engageable with a hood locking stud upon lateral rotation of said hood with respect to said cooking bowl; and e) a cooking grill removably supported within said cooking bowl peripheral top flange.

2. A portable barbecue cooking grill as in claim 1, said hood including at least one selectively closeable vent aperture defined in its top.

3. A portable barbecue cooking grill as in claim 1, wherein said supporting legs each have two free ends and a bent mid-portion defining a horizontal supporting surface said free ends being affixed to said bowl.

* * * * *